United States Patent
M

(10) Patent No.: US 9,934,663 B2
(45) Date of Patent: *Apr. 3, 2018

(54) APPARATUS AND METHOD FOR IMPROVED LIVE MONITORING AND ALARM HANDLING IN VIDEO SURVEILLANCE SYSTEMS

(71) Applicant: Honeywell International Inc., Morristown, NJ (US)

(72) Inventor: Deepak Sundar M, Bangalore (IN)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/269,533

(22) Filed: Sep. 19, 2016

(65) Prior Publication Data

US 2017/0004689 A1    Jan. 5, 2017

Related U.S. Application Data

(63) Continuation of application No. 14/928,462, filed on Oct. 30, 2015, now Pat. No. 9,462,327, which is a continuation of application No. 13/367,735, filed on Feb. 7, 2012, now Pat. No. 9,208,669.

(51) Int. Cl.
| | |
|---|---|
| *G08B 13/196* | (2006.01) |
| *H04N 7/18* | (2006.01) |
| *H04N 21/433* | (2011.01) |
| *H04N 21/435* | (2011.01) |
| *H04N 21/488* | (2011.01) |

(52) U.S. Cl.
CPC .. *G08B 13/19682* (2013.01); *G08B 13/19693* (2013.01); *H04N 7/181* (2013.01); *H04N 21/435* (2013.01); *H04N 21/4332* (2013.01); *H04N 21/488* (2013.01)

(58) Field of Classification Search
CPC .......... G08B 13/19682; H04N 21/435; H04N 21/4332; H04N 21/488; H04N 7/181
See application file for complete search history.

(56) References Cited

U.S. PATENT DOCUMENTS

| | | | |
|---|---|---|---|
| 9,208,669 B2* | 12/2015 | M | H04N 7/181 |
| 9,462,327 B2* | 10/2016 | M | H04N 7/181 |
| 2008/0129849 A1* | 6/2008 | Inoue | G06F 19/321 |
| | | | 348/266 |
| 2009/0021583 A1 | 1/2009 | Salgar et al. | |
| 2009/0178126 A1 | 7/2009 | Du et al. | |
| 2009/0199106 A1 | 8/2009 | Jonsson et al. | |
| 2009/0327949 A1 | 12/2009 | Subbian et al. | |
| 2011/0007156 A1 | 1/2011 | Sankaranarayanan et al. | |
| 2011/0109747 A1 | 5/2011 | Forrester et al. | |

(Continued)

*Primary Examiner* — Huy T Nguyen
(74) *Attorney, Agent, or Firm* — Husch Blackwell LLP

(57) ABSTRACT

Systems and methods for annotating a display of a video data stream with customized information are provided. Methods include selecting a video data stream, creating a video graphic help file (VGH file) associated with the video data stream, a data capture device associated with the video data stream, a monitored area captured by the data capture device associated with the video data stream, or a salvo view, adding customized information to the VGH file, determining a need to access the VGH file, recalling the VGH file, and displaying customized information in the VGH file.

14 Claims, 12 Drawing Sheets

(56) References Cited

U.S. PATENT DOCUMENTS

| | | |
|---|---|---|
| 2011/0291831 A1 | 12/2011 | Subbian et al. |
| 2012/0113265 A1 | 5/2012 | Galvin |
| 2012/0320201 A1 | 12/2012 | Boghossian et al. |
| 2014/0111542 A1* | 4/2014 | Wan .................. G06F 17/30253 |
| | | 345/633 |

* cited by examiner

APPARATUS AND METHOD FOR IMPROVED LIVE MONITORING AND ALARM HANDLING IN VIDEO SURVEILLANCE SYSTEMS

CROSS-REFERENCE TO RELATED APPLICATIONS

This application is a continuation of and claims the benefit of the filing date of U.S. application Ser. No. 14/928,462 filed Oct. 30, 2015, which is a continuation of and claims the benefit of the filing date of U.S. application Ser. No. 13/367,735 filed Feb. 7, 2012.

FIELD

The present invention relates generally to video management systems. More particularly, the present invention relates to systems and methods for annotating a display of a video data stream with customized information about an associated data collection device or an area monitored by an associated data collection device.

BACKGROUND

Video management systems can include a plurality of devices and sub-systems, such as, for example, surveillance cameras, video recorders (DVR, NVR, etc), encoders, switches, input devices, output devices, workstations, controllers, and viewers. Some video management systems can run twenty-four hours a day, seven days a week, and three hundred sixty-five days a year. These types of video management systems that monitor large surveillance sites can have hundreds of operators working shifts around the clock to continuously and constantly monitor video data streams collected from surveillance cameras in the system.

Surveillance cameras or other data collection devices that are part of video management systems can be configured with a basic description and name of the device. However, often such information is not sufficient to convey the need and importance of the area monitored by the device.

Video data streams from data collection devices can be displayed to a user at a workstation, for example, via closed circuit television (CCTV). The user at the workstation should preferably have some high level knowledge about the devices in the video management system, such as the location of the device and the reason for monitoring a particular area. When a user possesses such information, he can better focus his efforts to concentrate on data streams from certain data collection devices or areas and give less importance to data streams from other data collection devices or areas. However, when a user does not possess such information, there is a higher likelihood that he will miss or overlook certain incidents in a video data stream.

Known video management systems do not provide the desired high level knowledge to a user at a workstation and do not provide methods for providing or adding the desired high level knowledge. Instead, in known systems and methods, users must remember information specific to certain data collection devices and monitored areas. This can be a tedious and difficult task, especially in systems that include a large number of data collection devices and that monitor a large number of areas.

There is, thus, a continuing, ongoing need for improved systems and methods.

DETAILED DESCRIPTION

Figure 1:
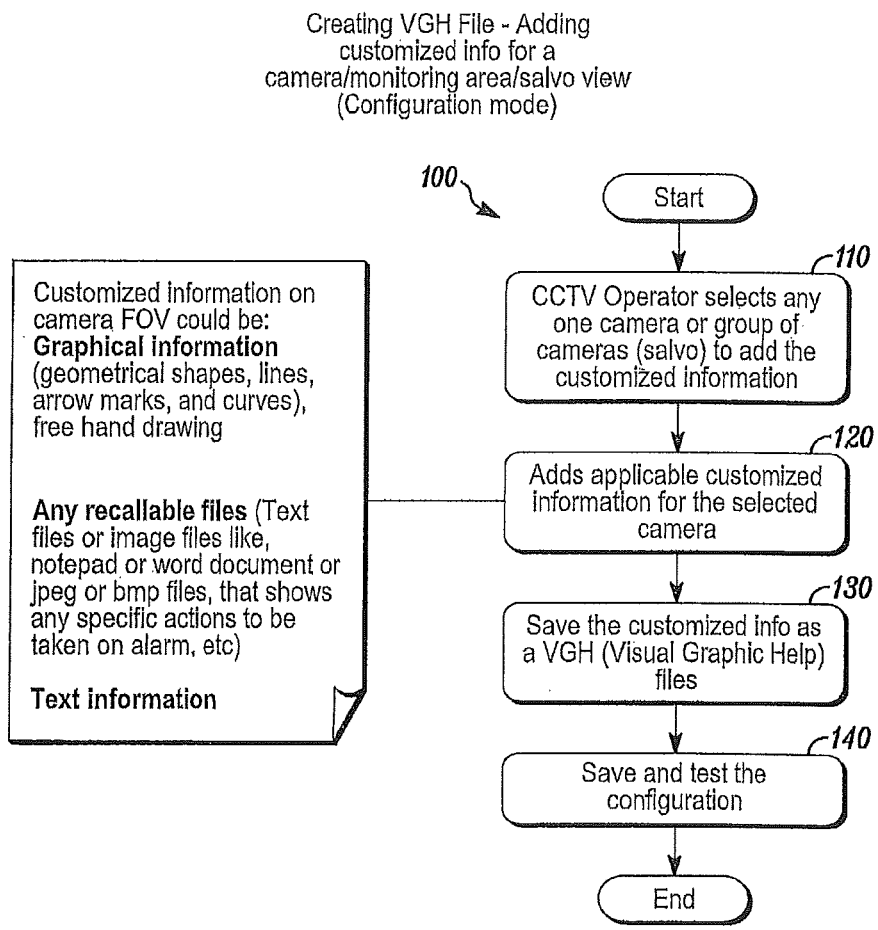
FIG. 1 is a flow diagram of a method of creating a VGH file in accordance with embodiments disclosed herein.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods for annotating a display of a video data stream with customized information about an associated data collection device or an area monitored by an associated data collection device. Preferably, such systems and methods can display the customized information on a portion of the display of the video data stream.

It is to be understood that systems and methods described herein can be executed in connection with real-time streaming video data streams, recorded video data streams, and/or exported video clips. However, the described systems and methods are not so limited.

In accordance with disclosed embodiments, a user or operator can add customized information about an associated monitored area or an associated data collection device or group of associated data collection devices, for example, a group of cameras associated with a salvo view on a workstation. This customized information can be stored in a file separate from a file containing a video data stream. For example, in some embodiments, the customized information can be stored in a visual graphic help file (VGH file) or a database of VGH files. Thus, the VGH file or any information therein does not alter or disturb files with video data streams. That is, the video data streams are preserved.

A VGH file can be recallable, as needed. For example, in some embodiments, customized information can be accessed in real time or used for post-event analysis and/or for forensic operations. In some embodiments, the customized information can be updated, as needed, for improved surveillance monitoring in the future. For example, users or operators with experience monitoring a particular area or the like can update a particular VGH file with additional customized information known to be useful and share that additional information, via the updated VGH file, with other users or operators. For example, the additional information could include time periods during which alarms are likely to occur in a monitored area or identifications of high risk monitored areas.

In some embodiments, a VGH file or a database of VGH files can be cross-referenced to a file or files of video data streams captured by data collection devices. Thus, when systems and methods disclosed herein recall a file with a video data stream and then display that video data stream, the correct VGH file can also be recalled and displayed. In some embodiments, a plurality of workstations can display the same VGH file at the same time.

It is to be understood that the customized information in a VGH file can be stored in and/or displayed on a plurality of different devices, including, but not limited to, a workstation, a data capture device, a personal computer, a thin client, a thick client, a personal digital assistant, a smart phone, a handheld device, or any other device that includes web-based hardware. For example, a VGH file can be loaded into a memory of a data capture device. Then, customized information in the VGH file can be viewed on a display of the data capture device. Thus, systems and methods can avoid a dependency on a workstation or video management system to access the VGH file. Further, the ability to show and hide the information in the VGH file also need not be dependent on a workstation or video management system.

A VGH file can include a plurality of different customizable information regarding a data collection device or an area monitored by a data collection device. For example, a VGH file can include graphical information, a recallable file, and/or text information. Graphical information can include, for example, geometrical shapes, lines, arrows, markings, curves, free hand drawings, or the like. Recallable files can include, for example, text or image files, such as Notepad, Microsoft Word, JPEG, BMP, or PDF files. In some embodiments, the files or information included in a VGH file can include information showing a specific action to be taken when a particular data collection device is in alarm or when a user indicates a need for more information.

In some embodiments, a VGH file can include instructions and/or steps for configuring a device in a video management system or any other integrated or head end system or device using video data streams as would be known by those of skill in the art, including, but not limited to, a fire system, a life safety system, a gas detection system, a location management system, a building management system, a process control system, an access control system, an intrusion detection system, and the like. In these embodiments, the VGH file need not be associated with a particular video data stream or data collection device.

According to systems and methods disclosed herein, when a video data stream is loaded, for example, for viewing at a workstation, an associated VGH file can also be loaded for viewing at the workstation. The information contained in the VGH file can be displayed on the workstation in a transparent window on at least a portion of a user interface displaying the loaded video data stream. In some embodiments, the associated VGH file can be loaded for viewing only when a user indicates a need for more information, for example, a need for information contained in the VGH file. In some embodiments, the associated VGH file can be loaded for viewing only when an associated data collection device is in alarm, for example, the associated VGH file can be automatically loaded for viewing when an associated data collection device is in alarm.

According to some embodiments, a workstation can display a video loss message when a video loss alarm occurs, and an associated VGH file can be loaded for viewing on the workstation, as needed. For example, when a problem occurs, such as a faulty power supply or faulty data collection device, the data collection device may not be able to send a video data stream to a workstation. The workstation and/or system in which the workstation is employed can sense this condition as a video loss alarm. In disclosed embodiments, the workstation can continue displaying the last received frame of the video data stream with a video loss message overlaid thereon to alert an operator of the current condition. Then, the operator can provide input to view an associated VGH file, for example, on an as needed basis. In these embodiments, the displayed information in the VGH file may assist the operator in detecting the source of the problem that caused the video loss alarm.

In some embodiments, the customized information in a VGH file can be suppressed or hidden on a display when a user indicates that there is no longer a need for the information in the VGH file or that there is no need for the information in the VGH file at the current time. In some embodiments, the customized information in a VGH file can be suppressed or hidden on a display when an associated surveillance camera is no longer in alarm or there is no need for the information in the VHG file at the current time. It is to be understood that the customized information in the VGH file can also be suppressed or hidden when viewing the information on a data capture device or any other device that comes within the sprit and scope of embodiments disclosed herein.

FIG. 1 is a flow diagram of a method 100 of creating a VGH file in accordance with embodiments disclosed herein. The method 100 can include adding customized information to a VGH file, such that the customized information relates to a surveillance camera or other data collection device, to a monitored area, or to a view provided by a user interface at a workstation.

As seen in FIG. 1, the method 100 can include a user or operator selecting a camera or group of cameras as in 110. In some embodiments, the selected camera or group of cameras can be the camera(s) or data collection device(s) with which the user wants to associate customized information.

Then, the method 100 can add applicable customized information for the selected camera(s) or data collection device(s) as in 120. In some embodiments, the customized information can be associated with a particular field of view for the selected camera(s) or data collection device(s).

As seen in FIG. 1, the method 100 can save the added customized information as or in a VGH file as in 130 and then save and test the configuration of the VGH file as in 140. It is to be understood that a VGH file can be saved as private or public, that is, shared. That is, when a user creates a VGH file, he can indicate if the file is to be made available to only him when monitoring a workstation or if the file is to be made available to other operators monitoring workstations.

In some embodiments, users or operators can log problems faced when monitoring video data streams. System administrators can review logged problems and, based on the frequency of problems, can create one or more VGH files to aid operators in overcoming known problems.

Figure 2:
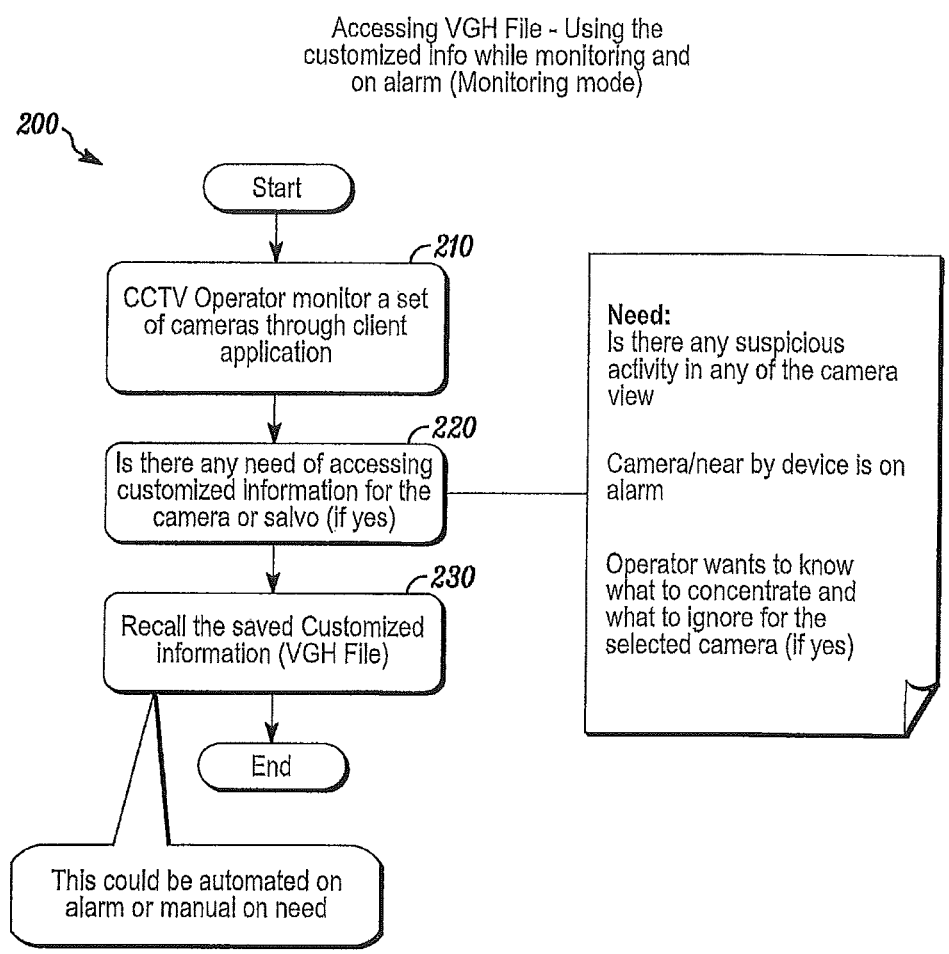
FIG. 2 is a flow diagram of a method of accessing a VGH file in accordance with embodiments disclosed herein.

FIG. 2 is a flow diagram of a method 200 of accessing a VGH file in accordance with embodiments disclosed herein. The method 200 can include viewing customized information stored in a VGH file while monitoring video data streams from data collection devices and/or while a data collection device is in alarm.

As seen in FIG. 2, the method 200 can include a user or operator monitoring video data streams captured by a plurality of surveillance cameras or data collection devices as in 210. In some embodiments, the video data streams can be displayed on a user interface of a workstation.

Then, the method 200 can determine if there is a need to access customized information for camera(s) or data collection device(s) associated with any of the displayed video data streams as in 220. For example, in some embodiments, the method 200 can determine that there is a need to access customized information when suspicious activity is detected in a video data stream and/or a monitored area captured by a surveillance camera, when a data collection device is in alarm or near another device in alarm, and/or when an operator provides input indicating that he needs information to focus his efforts. That is, the operator needs information to determine on which data streams, cameras, or areas to concentrate and/or what data streams, cameras, or areas to give less importance.

When the method 200 determines that there is a need to access customized information as in 220, then the method 200 can recall a VGH file with saved customized information as in 230. Which VGH file to recall can be determined based on a cross-reference to a data collection device or a monitored area. In some embodiments, a VGH file can be automatically recalled when a data collection device is in alarm. In some embodiments, a VGH file can be manually recalled based on user input indicating a need for a VGH file with customized information.

The methods shown in FIG. 1, FIG. 2, and others disclosed herein can be executed in connection with all types of video management systems and alarm monitoring systems. Specifically, the methods shown in FIG. 1, FIG. 2, and others disclosed herein can be implemented with a plurality of data collection devices 360, for example, video cameras, in communication with the system 300 shown in FIG. 3. For example, the system 300 can include a workstation connected to the plurality of data collected devices 360 via CCTV.

Figure 3:
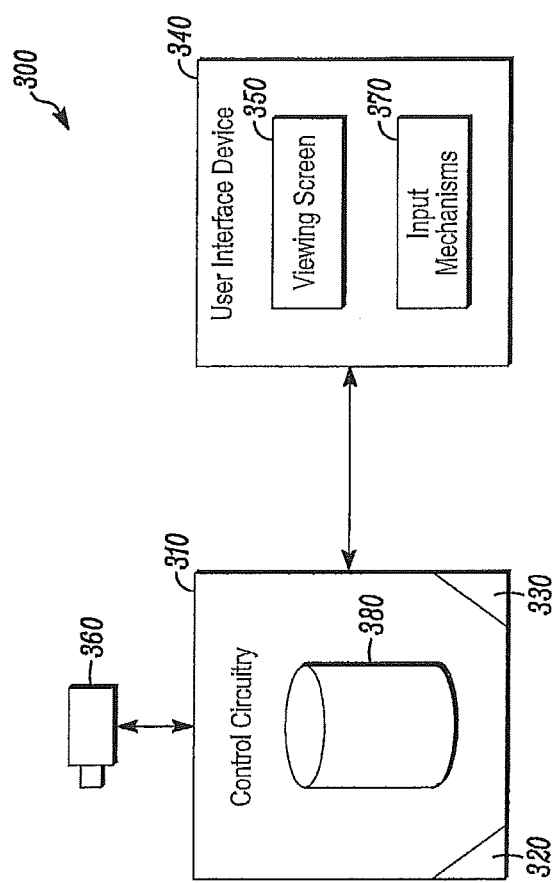
FIG. 3 is a block diagram of a system for carrying out the methods of FIG. 1 and FIG. 2 and others disclosed herein.

As seen in FIG. 3, the system 300 can include control circuitry 310, one or more programmable processors 320, and executable control software 330 as would be understood by those of skill in the art. The executable control software can be stored on a transitory or non-transitory local computer readable medium, including, but not limited to, local computer memory, RAM, optical storage media, magnetic storage media, flash memory, etc.

An associated user interface device 340 can be in communication with the control circuitry 310, and a viewing screen 350 of the user interface device 340, as would be known by those of skill in the art, can display interactive and viewing windows. In some embodiments, the user interface device 340 can be a multi-dimensional graphical user interface. In some embodiments, the user interface device 340 can include one or more input mechanisms 370, for example, a keypad or a mouse, that can receive user input.

Video data streams from the plurality of video cameras 360 can be reviewed in real time and/or be stored by a database 380 for later review. Then, an operator can view the video data streams via the viewing screen 350 of the user interface device 340 and enter input via the input mechanisms 370 for creating and/or accessing a VGH file.

The interactive and viewing windows shown and described herein are exemplary only. Those of skill in the art will understand that the features of the windows shown and described herein may be displayed by additional or alternate windows. Additionally, the windows shown and described herein can be displayed on any type of user device, for example, personal digital assistants, smart phones, and/or handheld devices.

Figure 4:
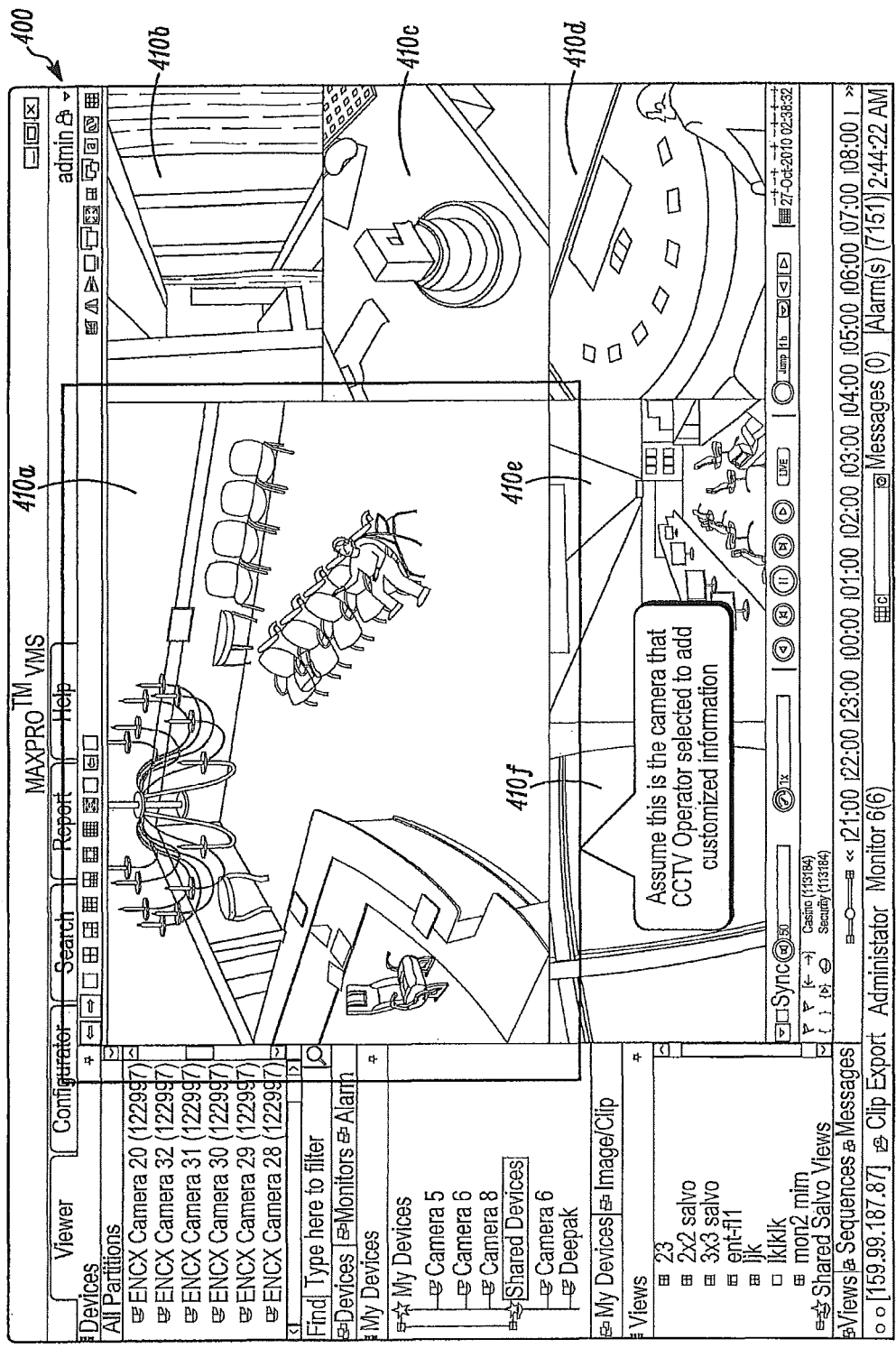
FIG. 4 is a view of an interactive window displayed on a viewing screen of a graphical user interface for creating a VGH file in accordance with embodiments disclosed herein.

FIGS. 4-8 are views of interactive windows displayed on viewing screens of a graphical user interface for creating a VGH file in accordance with embodiments disclosed herein. For example, as seen in FIG. 4, the window 400 can include a plurality of sub-windows 410a, 410b, 410c, 410d, 410e, 410f for displaying video data streams captured by respective ones of a plurality of data collection devices, for example, surveillance cameras. At least one of the sub-windows, for example, 410a, can be selected for associating customized information therewith.

Figure 5:
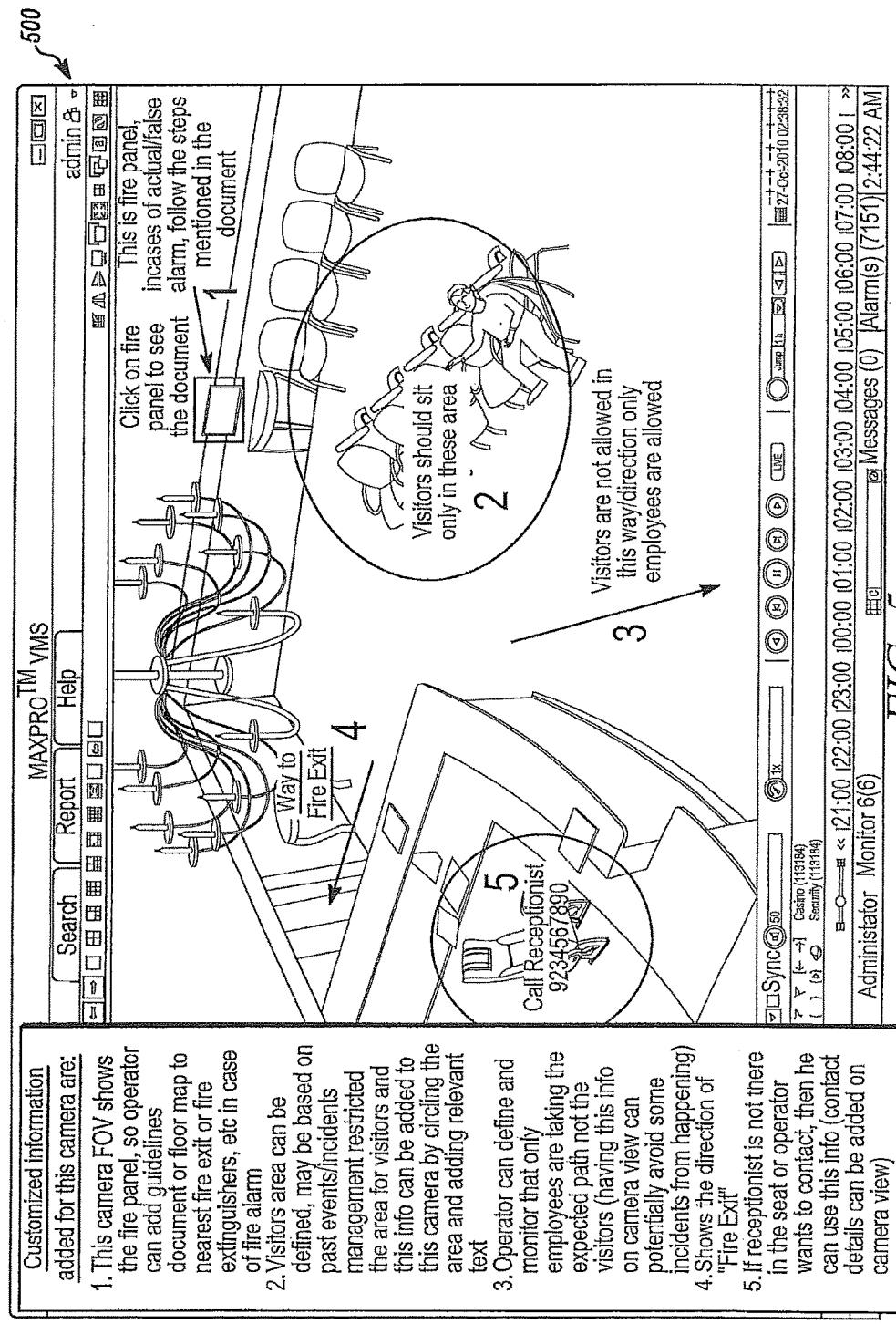
FIG. 5 is a view of an interactive window displayed on a viewing screen of a graphical user interface for creating a VGH file in accordance with embodiments disclosed herein.

As seen in FIG. 5, a VGH file can be created, and customized information regarding the monitored area displayed by the selected video data stream can be included in the VGH file.

The customized information can include text and graphics, including arrows and circles annotating the video data stream displayed on the window 500. In some embodiments a VGH file can include multiple information layers, for example, one layer with text, one layer with graphics, and one layer with text and graphics. In some embodiments, multiple information layers of VGH files, for example, one layer with text, one layer with graphics, and one layer with text and graphics can be associated with a video data stream or a salvo view. It is to be understood that multiple layers of VGH files can include multiple VGH files sandwiched on top of one another.

The customized information shown in FIG. 5 can include, for example, (1) a guidelines document and/or floor plan to a nearest fire exit or fire extinguishers; (2) a defined visitors' area; (3) a defined area for employees only; (4) a path to a fire exit; and/or (5) contact information for a receptionist or other personnel in the monitored area.

For example, the guidelines document and/or floor plan to a nearest fire exit or fire extinguishers can be shown on views of the monitored area that include a fire panel. In some embodiments, a user can provide user input to select the fire panel in order to view the guidelines document and/or floor plan. In some embodiments, the guidelines document and/or floor plan can provide action steps to take in the event of an alarm, for example, a fire alarm.

In some embodiments, the text and/or graphics of all notices or signs in a monitored area can be made available as customized information in an associated VGH file. Thus, a user can view information on the notice or sign even if that information would otherwise not be viewable.

The defined visitors' area can be based on past events or incidents in the monitored area. For example, the defined visitors' area can indicate an area to which visitors to the monitored area are restricted. As seen in FIG. 5, the defined visitors' area can be shown with a circle around the area and with relevant text explaining the area.

The defined area for employees can indicate an area and/or pathway in which only employees, but not visitors, can enter. Showing this customized information on a display with a video data stream can aid an operator or user in preventing certain incidents from occurring.

The path to a fire exit can show a direction occupants of the monitored area can take to reach a fire exit, for example, during a fire alarm.

Finally, the contact information for a receptionist or other personnel in the monitored area can indicate methods that a user or operator can employ to contact the receptionist or other personnel when the receptionist is not in his designated area and the operator needs to reach the receptionist. For example, the telephone number for the receptionist can be displayed.

It is to be understood that the customized information shown in FIG. 5 and described above is exemplary only. However, embodiments described herein are not so limited. Rather, the embodiments disclosed and described are applicable to other kinds of events and actions that can occur in a monitored area.

Figure 6:
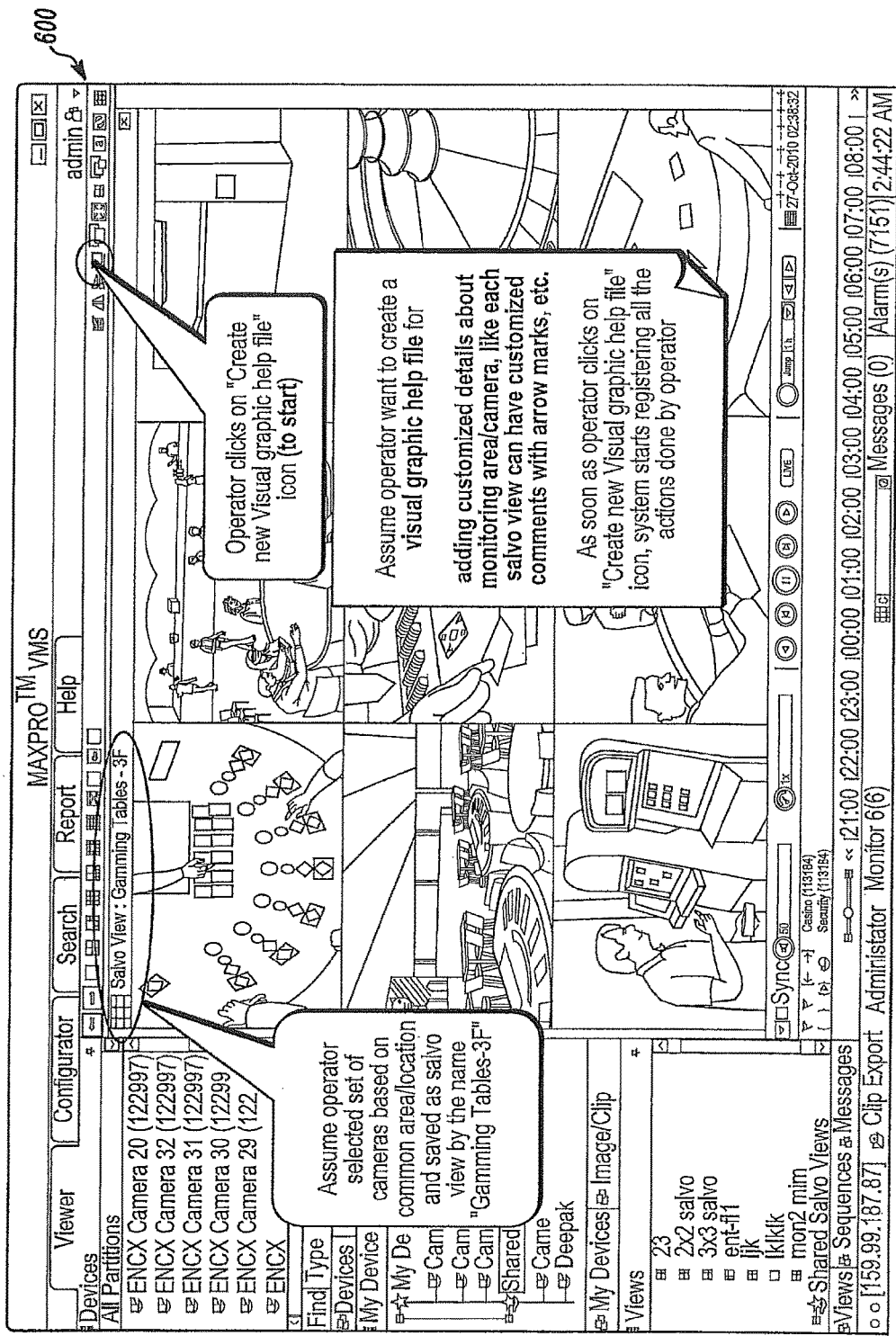
FIG. 6 is a view of an interactive window displayed on a viewing screen of a graphical user interface for creating a VGH file in accordance with embodiments disclosed herein.

As seen in FIG. 6, the window 600 can display a plurality of video data streams from a set of cameras that monitor a common area or location, for example, gaming tables in a casino. The view of the plurality of video data streams can be saved with a salvo name so that the view of the plurality of video data streams can be recalled at a later time simply by selecting the saved salvo name.

In some embodiments, a user can provide user input to create a VGH file for adding customized details about a monitored area, a surveillance camera, a saved salvo, or the like. For example, the user can click or otherwise select an icon displayed on the window 600 to start the creation of a VGH file. In some embodiments, once the icon is selected, systems and methods can register, track, and/or save all actions performed by the user and/or all input provided by the user.

Figure 7:
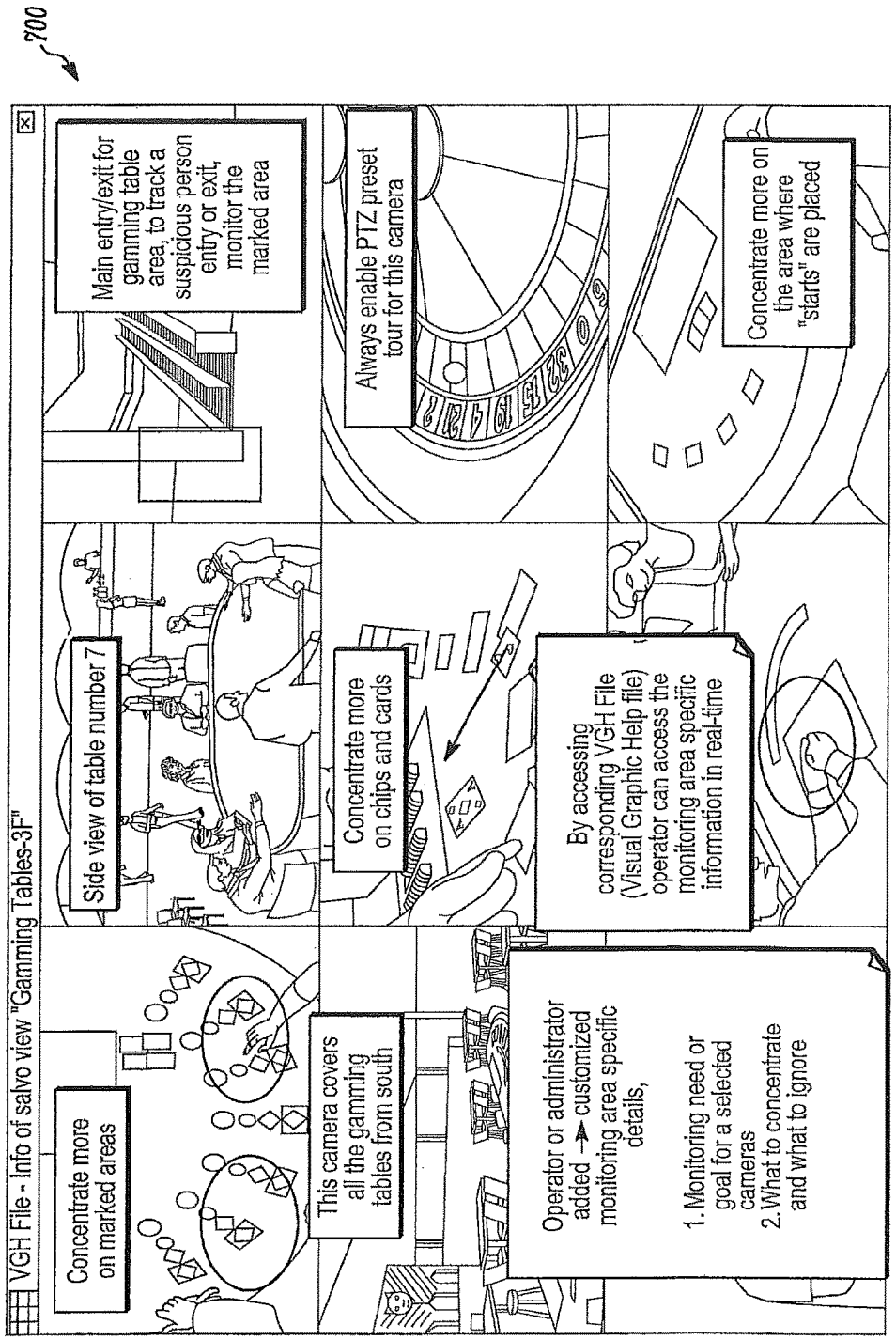
FIG. 7 is a view of an interactive window displayed on a viewing screen of a graphical user interface for creating a VGH file in accordance with embodiments disclosed herein.

As seen in FIG. 7, an operator can added customized information to a VGH file, and the customized information can be specific to a particular monitored area. For example, the customized information can explain the need or goal for monitoring a particular area with the associated surveillance camera and/or on what an operator should concentrate and what an operator can ignore.

In some embodiments, customized information added to a VGH file can include (1) text indicating an operator should concentrate more on areas marked with graphics, for example, circles; (2) text explaining the view captured by the associated surveillance camera, for example, a side view; (3) text explaining the monitored area and why that area is monitored, including a sub-area marked by graphics, for example, a rectangle; (4) text explaining what areas are captured by a surveillance camera; (5) text and arrows indicating on what area an operator should concentrate; (6) text explaining desired settings of an associated surveillance camera, for example, a PTZ setting; and/or (7) text and graphics, for example, stars, indicating on what area an operator should concentrate.

With the assistance of customized information in a VGH file, an operator can efficiently and effectively monitor video data streams from a plurality of surveillance cameras in real time. For example, the VGH file can be accessed and information therein can be displayed in real time.

Figure 8:
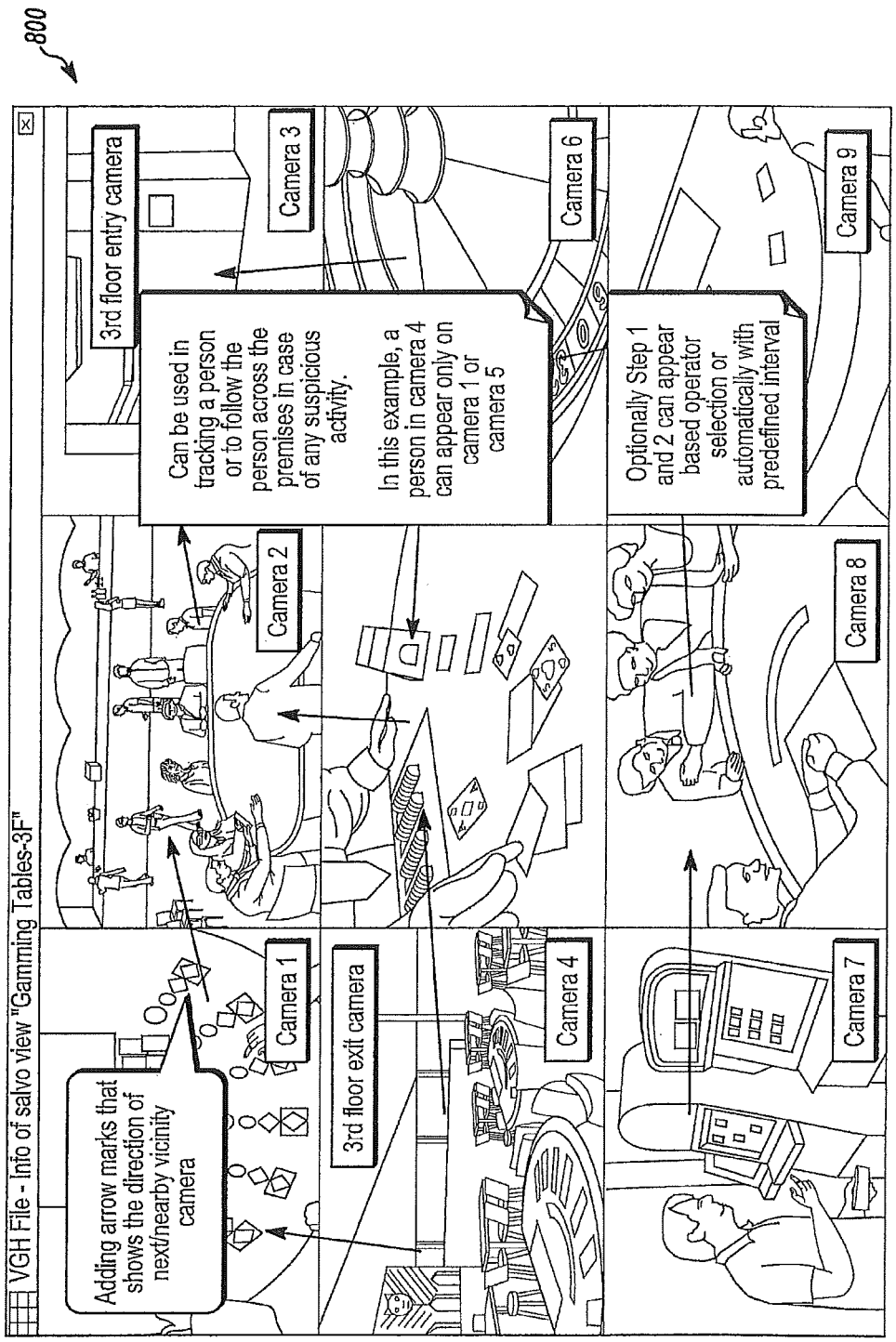
FIG. 8 is a view of an interactive window displayed on a viewing screen of a graphical user interface for creating a VGH file in accordance with embodiments disclosed herein.

As seen in FIG. 8, graphics, for example, arrows, can be included in a VGH file to show the direction of a nearby surveillance camera. Furthermore, graphics, for example, arrows, can be included to track or follow a person as he travels between areas monitored by different surveillance cameras, for example, when that person is engaging in suspicious activity.

Figure 9A:
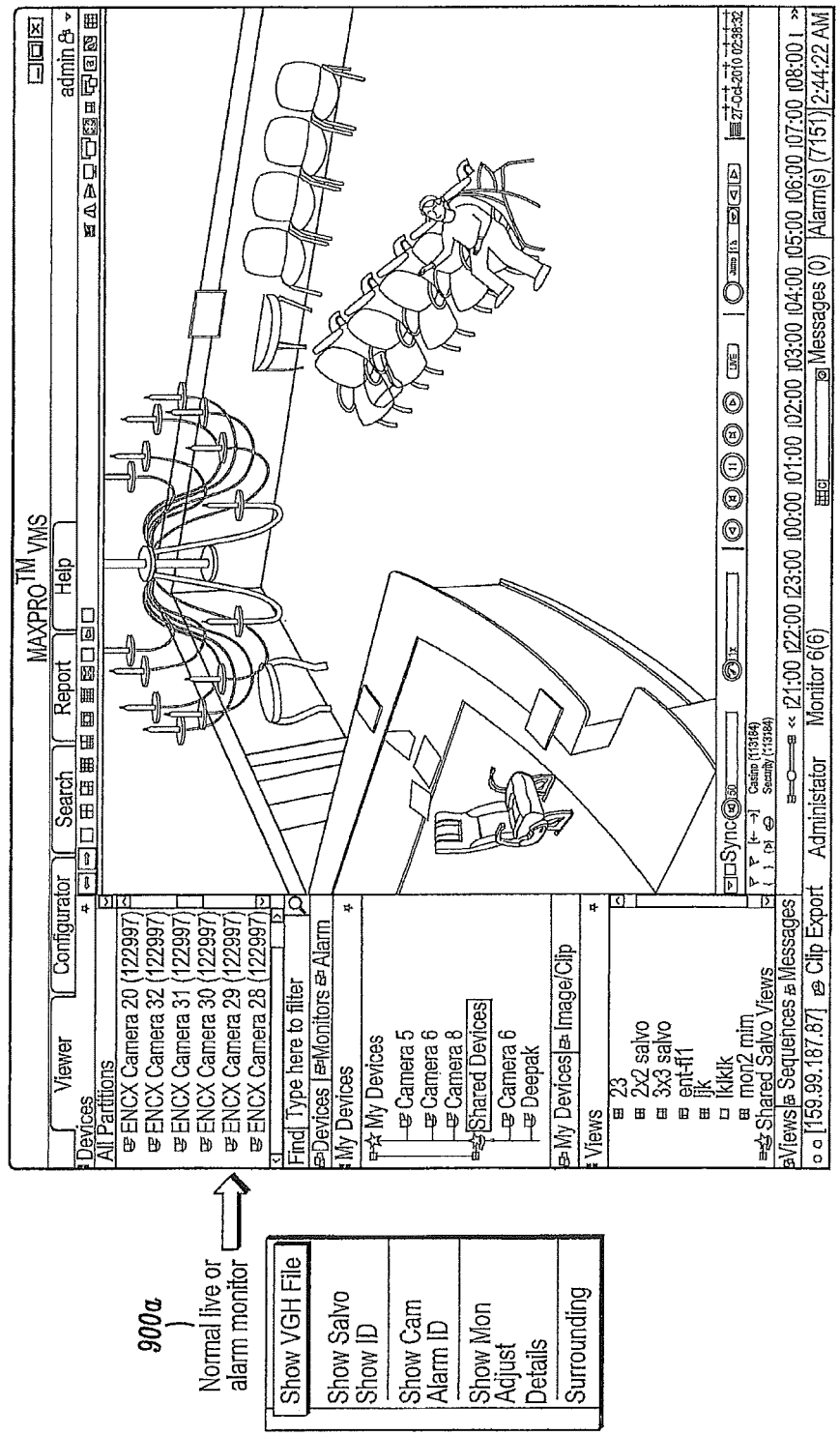
FIG. 9A is a view of an interactive window displayed on a viewing screen of a graphical user interface for accessing a VGH file in accordance with embodiments disclosed herein.
Figure 9B:
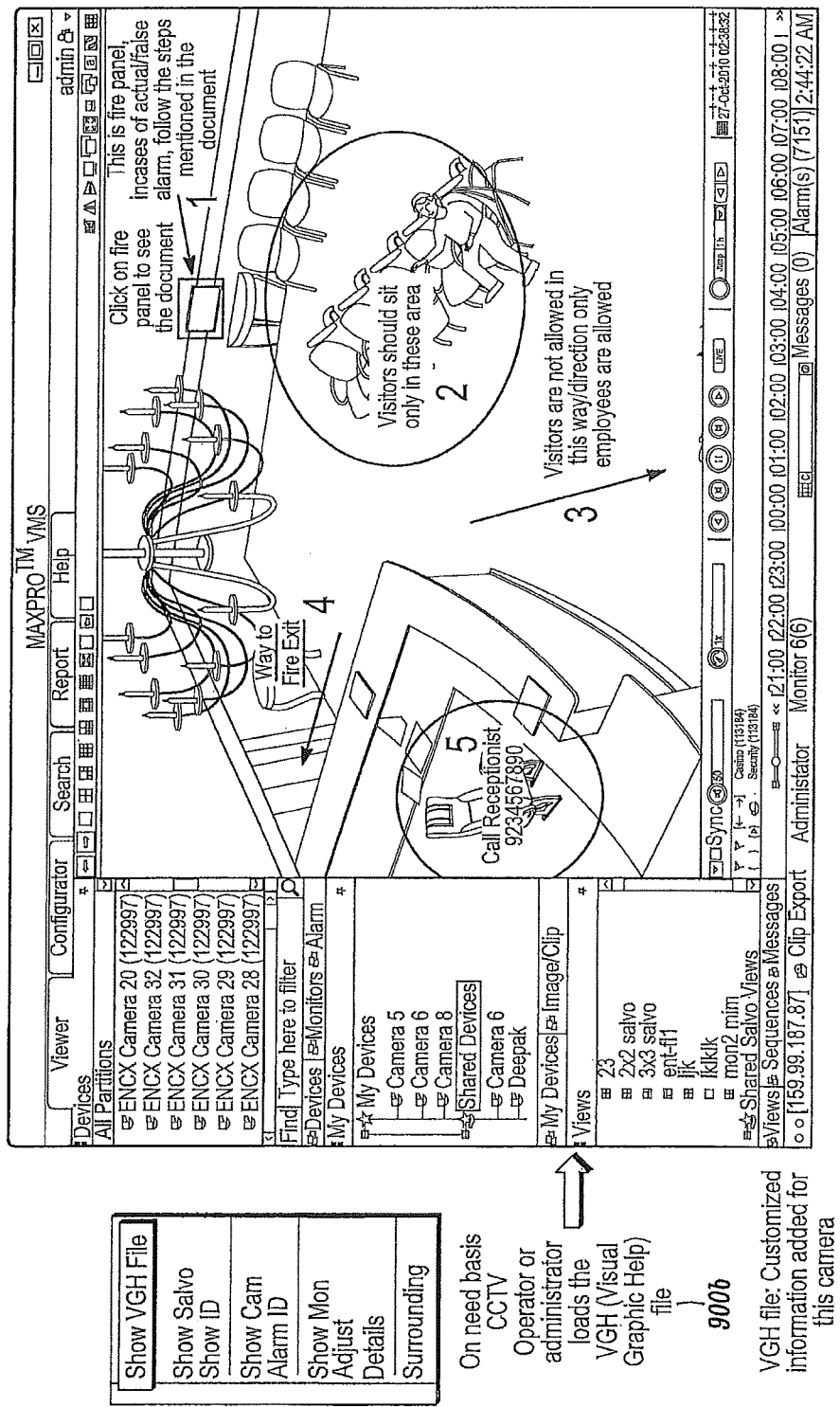
FIG. 9B is a view of an interactive window displayed on a viewing screen of a graphical user interface for accessing a VGH file in accordance with embodiments disclosed herein.

FIGS. 9A, 9B, 10A, and 10B are views of interactive windows displayed on viewing screens of a graphical user interface for accessing a VGH file in accordance with embodiments disclosed herein. For example, as seen in FIGS. 9A and 9B, a video data stream can be displayed in a window 900a in normal operation. When a user provides input to show a VGH file associated with the video data stream, the surveillance camera that captured the video data stream, and/or the monitored area shown in the video data stream, the associated VGH file can be loaded and displayed. For example, the window 900b can display the video data stream and the customized information in the loaded VGH file.

Figure 10A:
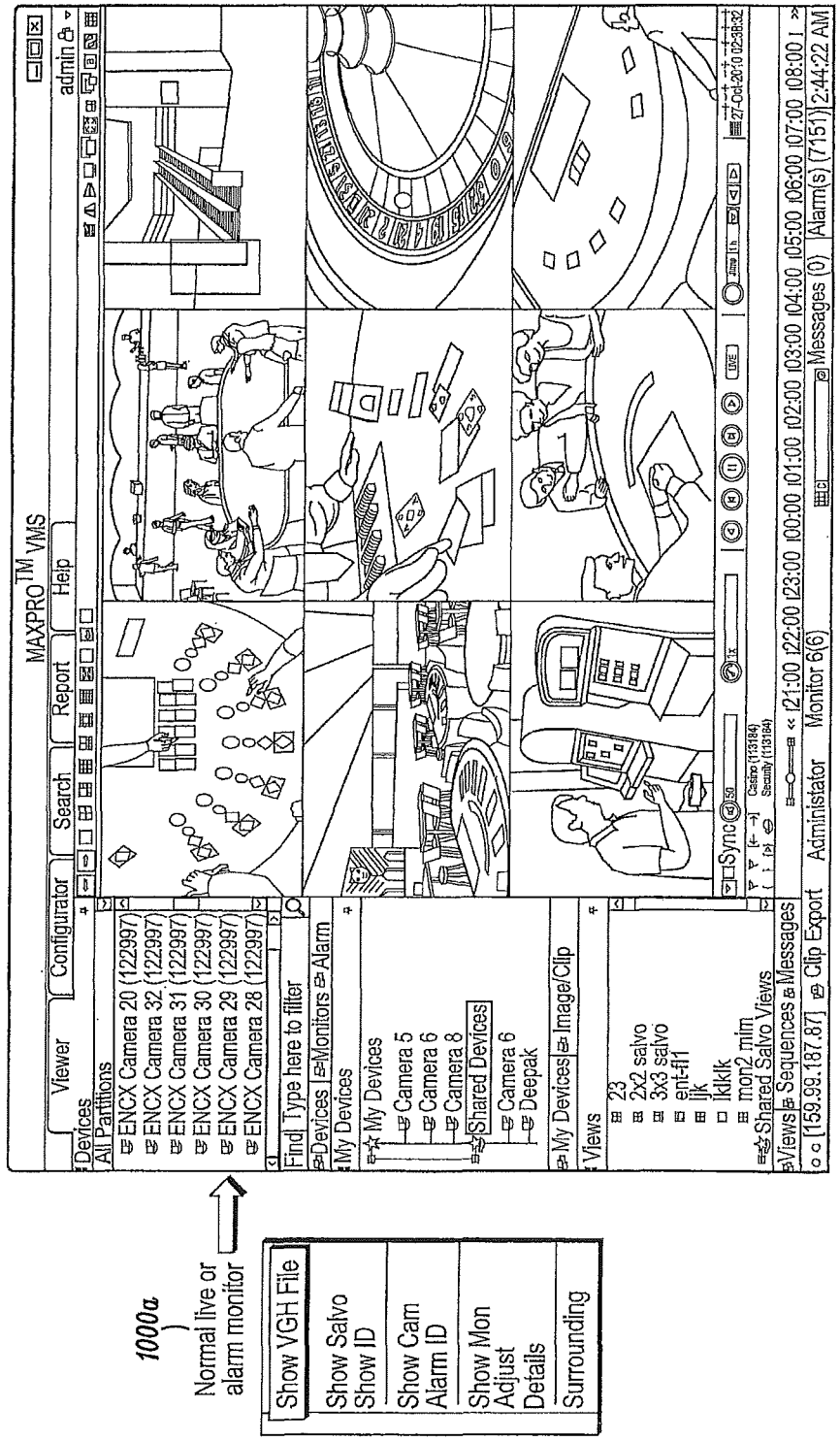
FIG. 10A is a view of an interactive window displayed on a viewing screen of a graphical user interface for accessing a VGH file in accordance with embodiments disclosed herein.
Figure 10B:
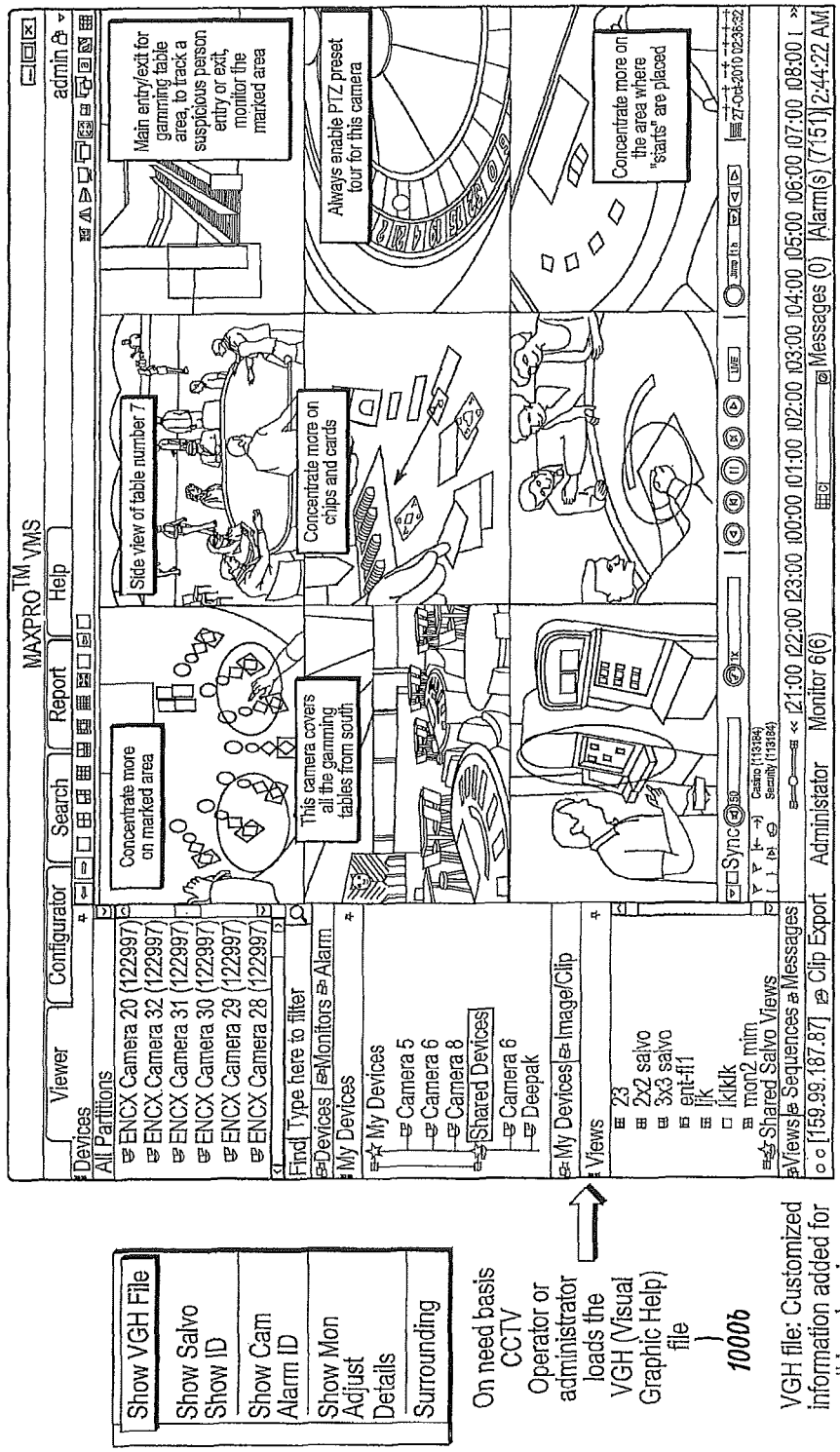
FIG. 10B is a view of an interactive window displayed on a viewing screen of a graphical user interface for accessing a VGH file in accordance with embodiments disclosed herein.

Similarly, as seen in FIGS. 10A and 10B, video data streams from a plurality of surveillance cameras, that is, a salvo view, can be displayed in a window 1000a in normal operation. When a user provides input to show a VGH file associated with the video data streams, the surveillance cameras that captured the video data streams, the monitored area shown in the video data streams, and/or the salvo view, the associated VGH file can be loaded and displayed. For example, the window 1000b can display the video data streams and the customized information in the loaded VGH file.

It is to be understood that a plurality of VGH files can be associated with a single video data stream, surveillance camera, monitored area, or salvo view. Thus, systems and methods in accordance with disclosed embodiments can create and associate multiple VGH files with a single video data stream, surveillance camera, monitored area, or salvo view. Further, systems and methods in accordance with disclosed embodiments can access and display customized information in multiple VGH files substantially simultaneously.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A method comprising:
creating a first file;
associating the first file with a video data stream in a second file, a data capture device associated with the video data stream, and a monitored area captured by the data capture device associated with the video data stream;

receiving first customized information from a user with experience in monitoring the monitored area captured by the data capture device associated with the video data stream;

storing the first customized information in the first file;

responsive to the data capture device associated with the video data stream being in an alarm state, recalling the first file and the video data stream; and responsive to recalling the first file and the video data stream, displaying the first customized information in the first file superimposed over the video data stream.

2. The method of claim 1 further comprising storing the first file separately from the second file.

3. The method of claim 1 further comprising cross-referencing the first file with the second file.

4. The method of claim 1 further comprising saving the first file as one of private or public.

5. The method of claim 1 further comprising updating the first file with additional customized information.

6. The method of claim 1 further comprising receiving user input to select the video data stream from a display on at least one of a user interface device, the data capture device, a personal computer, a thin client, a thick client, a personal digital assistant, a smart phone, and a handheld device.

7. The method of claim 1 further comprising loading the first file into a memory of the data capture device.

8. A method comprising:

determining a need to access a first file associated with a video data stream in a second file, a data capture device associated with the video data stream, and a monitored area captured by the data capture device associated with the video data stream, the first file containing customized information received from a user with experience in monitoring the monitored area captured by the data capture device associated with the video data stream;

responsive to the data capture device associated with the video data stream being in an alarm state, recalling the first file and the video data stream; and responsive to recalling the first file and the video data stream, displaying the customized information in the first file superimposed over the video data stream, wherein determining the need to access the first file is based on the data capture device associated with the video data stream being in the alarm state.

9. The method of claim 8 further comprising displaying the customized information in the first file on at least one of a user interface device, the data capture device, a personal computer, a thin client, a thick client, a personal digital assistant, a smart phone, and a handheld device.

10. The method of claim 8 wherein recalling the first file and displaying the customized information in the first file occurs in one of real time or post-event analysis.

11. The method of claim 8 further comprising storing the first file separately from the second file.

12. The method of claim 8 further comprising suppressing the customized information in the first file.

13. The method of claim 8 wherein recalling the first file includes cross-referencing the second file with the first file.

14. A system comprising:

a programmable processor;

a user interface device; and executable control software stored on a non-transitory computer readable medium for:

creating a first file;

associating the first file with a video data stream in a second file, a data capture device associated with the video data stream, and a monitored area captured by the data capture device associated with the video data stream;

storing customized information in the first file, the customized information received from a user with experience in monitoring the monitored area captured by the data capture device associated with the video data stream;

responsive to the data capture device associated with the video data stream being in an alarm mode, determining a need to access the first file;

responsive to the determining, recalling the first file and the video data stream; and responsive to the recalling, displaying the customized information in the first file superimposed over the video data stream.

* * * * *